US008498497B2

(12) United States Patent
Panabaker et al.

(10) Patent No.: US 8,498,497 B2
(45) Date of Patent: Jul. 30, 2013

(54) SWARM IMAGING

(75) Inventors: Ruston John David Panabaker, Bellevue, WA (US); Eric Horvitz, Kirkland, WA (US); Johannes Klein, Redmond, WA (US); Gregory Baribault, Lynnwood, WA (US); Feng Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 11/561,378

(22) Filed: Nov. 17, 2006

(65) Prior Publication Data
US 2008/0118184 A1 May 22, 2008

(51) Int. Cl.
G06K 9/36 (2006.01)
G09G 5/00 (2006.01)
H04N 9/74 (2006.01)

(52) U.S. Cl.
USPC ............................. 382/284; 345/629; 348/584

(58) Field of Classification Search
USPC ............ 382/284; 345/629–641; 348/584–601
See application file for complete search history.

(56) References Cited

U.S. PATENT DOCUMENTS

| 4,673,974 | A | | 6/1987 | Ito et al. | |
|---|---|---|---|---|---|
| 5,187,571 | A | * | 2/1993 | Braun et al. | 348/39 |
| 5,200,818 | A | * | 4/1993 | Neta et al. | 348/39 |
| 5,359,363 | A | * | 10/1994 | Kuban et al. | 348/36 |
| 5,798,762 | A | * | 8/1998 | Sfarti et al. | 345/420 |
| 5,850,352 | A | * | 12/1998 | Moezzi et al. | 345/419 |
| 5,923,791 | A | * | 7/1999 | Hanna et al. | 382/295 |
| 6,393,163 | B1 | | 5/2002 | Burt | |
| 6,498,857 | B1 | | 12/2002 | Sibbald | |
| 6,618,074 | B1 | | 9/2003 | Seeley | |
| 6,654,814 | B1 | * | 11/2003 | Britton et al. | 709/246 |
| 6,677,982 | B1 | | 1/2004 | Chen | |
| 6,760,063 | B1 | * | 7/2004 | Kamei | 348/211.8 |
| 6,954,229 | B1 | | 10/2005 | Otala | |
| 7,003,795 | B2 | | 2/2006 | Allen | |
| 7,010,097 | B2 | | 3/2006 | Zelllner et al. | |

(Continued)

FOREIGN PATENT DOCUMENTS

| EP | 1134718 | 9/2001 |
|---|---|---|
| EP | 1241898 | 9/2002 |

(Continued)

OTHER PUBLICATIONS

Matos et al., "An automated Negotiation Model for M-commerce Using Mobile Agents", Lecture in Note in Computer Science, Jan. 2003, Springer Berlin, vol. 2722/2003, pp. 72-75.*

(Continued)

*Primary Examiner* — Randolph I Chu
(74) *Attorney, Agent, or Firm* — L. Alan Collins; Collins & Collins Intellectual, LLC

(57) ABSTRACT

A method and apparatus is provided for collecting data and generating synthesized data from the collected data. For example, a request for an image may be received from a requestor and at least one data capture device may be identified as capable of providing at least a portion of the requested image. A request may be sent to identified data capture devices to obtain an image corresponding to the requested image. Multiple images may be received from the data capture devices and may further be connected or stitched together to provide a panoramic, 3-dimensional image of requested subject matter.

18 Claims, 12 Drawing Sheets

U.S. PATENT DOCUMENTS

| | | | |
|---|---|---|---|
| 7,015,954 B1* | 3/2006 | Foote et al. | 348/218.1 |
| 7,027,616 B2* | 4/2006 | Ishii et al. | 382/104 |
| 7,085,435 B2 | 8/2006 | Takiguchi | |
| 7,161,616 B1* | 1/2007 | Okamoto et al. | 348/148 |
| 7,194,112 B2* | 3/2007 | Chen et al. | 382/106 |
| 7,239,312 B2* | 7/2007 | Urisaka et al. | 345/419 |
| 7,277,118 B2* | 10/2007 | Foote | 348/36 |
| 7,373,017 B2 | 5/2008 | Edwards | |
| 7,423,670 B2 | 9/2008 | Kawai | |
| 7,429,997 B2* | 9/2008 | Givon | 348/46 |
| 7,643,653 B2* | 1/2010 | Garoutte | 382/103 |
| 7,710,463 B2* | 5/2010 | Foote | 348/218.1 |
| 7,712,125 B2* | 5/2010 | Herigstad et al. | 725/141 |
| 7,734,116 B2 | 6/2010 | Panabaker | |
| 7,920,169 B2* | 4/2011 | Jung et al. | 348/211.1 |
| 2001/0019363 A1 | 9/2001 | Katta | |
| 2002/0122073 A1* | 9/2002 | Abrams et al. | 345/838 |
| 2003/0197785 A1 | 10/2003 | White et al. | |
| 2004/0002984 A1 | 1/2004 | Hasegawa | |
| 2004/0095467 A1* | 5/2004 | Koizumi | 348/169 |
| 2005/0220361 A1* | 10/2005 | Yamasaki | 382/284 |
| 2006/0033733 A1 | 2/2006 | Urisaka | |
| 2006/0044599 A1 | 3/2006 | Lipowitz | |
| 2006/0059003 A1* | 3/2006 | Requena et al. | 705/1 |
| 2006/0066730 A1 | 3/2006 | Evans et al. | |
| 2006/0077255 A1 | 4/2006 | Cheng | |
| 2006/0152589 A1 | 7/2006 | Morrison | |
| 2006/0152592 A1* | 7/2006 | Chishima et al. | 348/211.3 |
| 2006/0210166 A1 | 9/2006 | Takemoto | |
| 2007/0291119 A1 | 12/2007 | Amico | |
| 2007/0299981 A1* | 12/2007 | Baird | 709/231 |
| 2008/0085096 A1* | 4/2008 | Marshall | 386/52 |
| 2008/0107401 A1 | 5/2008 | Vannier | |
| 2008/0120306 A1 | 5/2008 | Panabaker | |
| 2008/0126982 A1 | 5/2008 | Sadikali | |
| 2008/0266408 A1 | 10/2008 | Kim | |
| 2010/0098327 A1* | 4/2010 | Se et al. | 382/154 |
| 2010/0271490 A1* | 10/2010 | Jung et al. | 348/207.1 |
| 2010/0321504 A1* | 12/2010 | Miyamaki et al. | 348/169 |
| 2011/0109715 A1* | 5/2011 | Jing et al. | 348/14.08 |
| 2012/0146791 A1* | 6/2012 | Naidoo et al. | 340/541 |

FOREIGN PATENT DOCUMENTS

| | | |
|---|---|---|
| JP | 63-163681 A | 7/1988 |
| JP | H09/091408 | 4/1997 |
| JP | 2000/059682 | 2/2000 |
| JP | 2002-027446 A2 | 1/2002 |
| JP | 2002/366558 | 12/2002 |
| JP | 2002/366948 | 12/2002 |
| JP | 2003/324718 | 11/2003 |
| JP | 2003/337940 | 11/2003 |
| JP | 2004/120252 A | 4/2004 |
| JP | 2004-288131 A | 10/2004 |
| JP | 2004/334467 | 11/2004 |
| JP | 2005/039580 A | 2/2005 |
| JP | 2005/176142 | 6/2005 |
| JP | 2006/186645 | 7/2006 |
| JP | 2006-202062 A | 8/2006 |
| WO | WO 9951027 A1 | 10/1999 |
| WO | WO 01/22728 A1 | 3/2001 |
| WO | WO 2005/099423 | 10/2005 |

OTHER PUBLICATIONS

Ulrich Neumann et al. "Augmented Virtual Environments (AVE): Dynamic Fusion of Imagery and 3D Models", IEEE Virtual Reality, 2003.

Gang Wu et al. "Multi-camera Spatio-temporal Fusion and Biased Sequence-data Learning for Security Surveillance", Proceedings of the eleventh ACM international conference on Multimedia, 2003, pp. 528-538.

Robert T. Collins et al. "Algorithms for Cooperative Multisensor Surveillance", Proceedings of the IEEE, 2001, vol. 89, Issue 10, pp. 1456-1477.

G. Stein et al. "Monitoring activities from multiple video streams: Establishing a common coordinate frame", A.I. Memo No. 1655, Massachusetts Institute of Technology, Apr. 1999.

W.E.L. Grimson et al. "Using adaptive tracking to classify and monitor activities in a site", Proceedings of the IEEE Computer Society Conference on Computer Vision and Pattern Recognition, 1998.

Jason Campbell et al. "IrisNet: An Internet-Scale Architecture for Multimedia Sensors", Proceedings of the 13th annual ACM international conference on Multimedia, 2005, pp. 81-88.

Candace Lombardi "Microsoft turns photo albums into navigable 3D worlds", published Aug. 2, 2006, retrieved from the Internet http://news.com.com/Microsoft+turns+photo+albums+into+navigable+3D+worlds/2100-1025_3-6101388.html.

Microsoft Live Labs "What is Photosynth?" retrieved from the Internet http://labs.live.com/photosynth/whatis/ on Nov. 17, 2006, Copyright 2006 Microsoft Corporation.

Wang, "Region-Based Stereo Panorama Disparity Adjusting", 2006 IEEE 8th Workshop on Multimedia Signal Processing, Oct. 3-6, 2006, pp. 186-191.

"PTStitcher", PanoTools.org Wiki. Webpage (Retrived Nov. 27, 2008), Available at http://wiki.panotools.org/PTStitcher.

"Autopano Pro Features", spec—Panorama software, retrieved Nov. 27, 2008 http://www.autopano.net/photo-stitching-solutions/autopano-pro/features.html.

"Quickstitch Version 2.0" Product Review: The premier panorama-stitching program, for PC and Mac? Retrieved Nov. 27, 2008 www.imaging-resource.com/soft/qstitch/qs2.htm.

First Office Action for Application No. 2007/80042811.6, People's Republic of China, Date of Dispatch Jul. 13, 2010.

Search Report PCT/US2007/085020, for Application No. 317623.02WO, mailed Jun. 16, 2008.

CN Second Office Action, Application No. 200780042811.6, Dec. 21, 2010.

JP Notice of Reasons for Rejection, Application No. 2009-537398, Jan. 19, 2012.

EP Supplementary Search Report, Reference EP63112RK900aha, for Application No. 07871513.3—2202/2098065 PCT/U52007085020, Mar. 5, 2012.

JP Finai Decision of Rejection for Application No. 2009—537398, Oct. 4, 2012.

* cited by examiner

SWARM IMAGING

BACKGROUND

Individuals may desire images or other data pertaining to a particular location or subject matter. In addition, these individuals may wish to obtain detailed data describing general as well as specific details of the particular location. The individuals may wish to obtain images of a certain geographic location. However, the individuals would have to obtain a camera or other device for capturing images and travel to the geographic location to take the image. Alternatively, the individuals may obtain an image of the geographic location if an image can be found elsewhere (e.g., on the Internet or in a book).

However, it is inconvenient for an individual to travel to the geographic site to take the image. This is particularly true if the geographic location is located at a long distance from the individual. Even if the individual were to travel to the location to take the image, the individual would likely obtain only a few images which would likely be insufficient for fully portraying the location of interest. It would also be labor intensive to take an adequate number of images to obtain complete information on the location.

Alternatively, if the individual attempts to obtain images from an external source such as from the Internet or from a book, the images stored at the external source may be outdated. It is likely that the images were obtained in the past and changes (e.g., demolitions or new construction, etc.) may have occurred at the location since the acquisition of the stored image. In such a case, the images obtained would not reflect the present condition of the location.

Also, if the individual were to obtain images of the location either from traveling to the location to take the images or by obtaining the images from an external source such as from an encyclopedia or from the internet or by other standard means, the images obtained would likely be limited by the quality of the available images or the inherent limitations of the camera (or other device) used for obtaining the images. These problems, coupled with the likelihood that the images obtained are outdated would result in a situation where a user is provided with an inadequate number of sub-optimal images that merely reflect the condition of a location in the past as opposed to the location in its present state.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method is provided for synthesizing an image based on a plurality of received images. For example, a request for an image of a subject is received and devices capable of providing images of the requested subject are identified. A request is sent to the identified devices for producing the images. The images from the devices may be used to synthesize an image of the requested subject. For example, the images from the devices may be stitched together to create a panoramic or 3-dimensional image of the requested subject matter.

In another example, a computer-readable medium is provided having computer executable instructions stored thereon for instructing devices to provide images of requested subject matter and assembling the images to generate a panoramic image of the subject matter.

In yet another example, a system generates a synthesized image or model of a real-world subject. In this example, a plurality of images is requested from and collected from data capture devices. The requested images may be connected together to create a synthesized image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A method and system for facilitating federation of devices in a network for data capture and processing is described. In one example, a synthetic image or model is created of a real-world subject. The synthetic image or model may further be created by stitching together multiple images where the multiple images may be requested and received from data capture devices.

Figure 1:
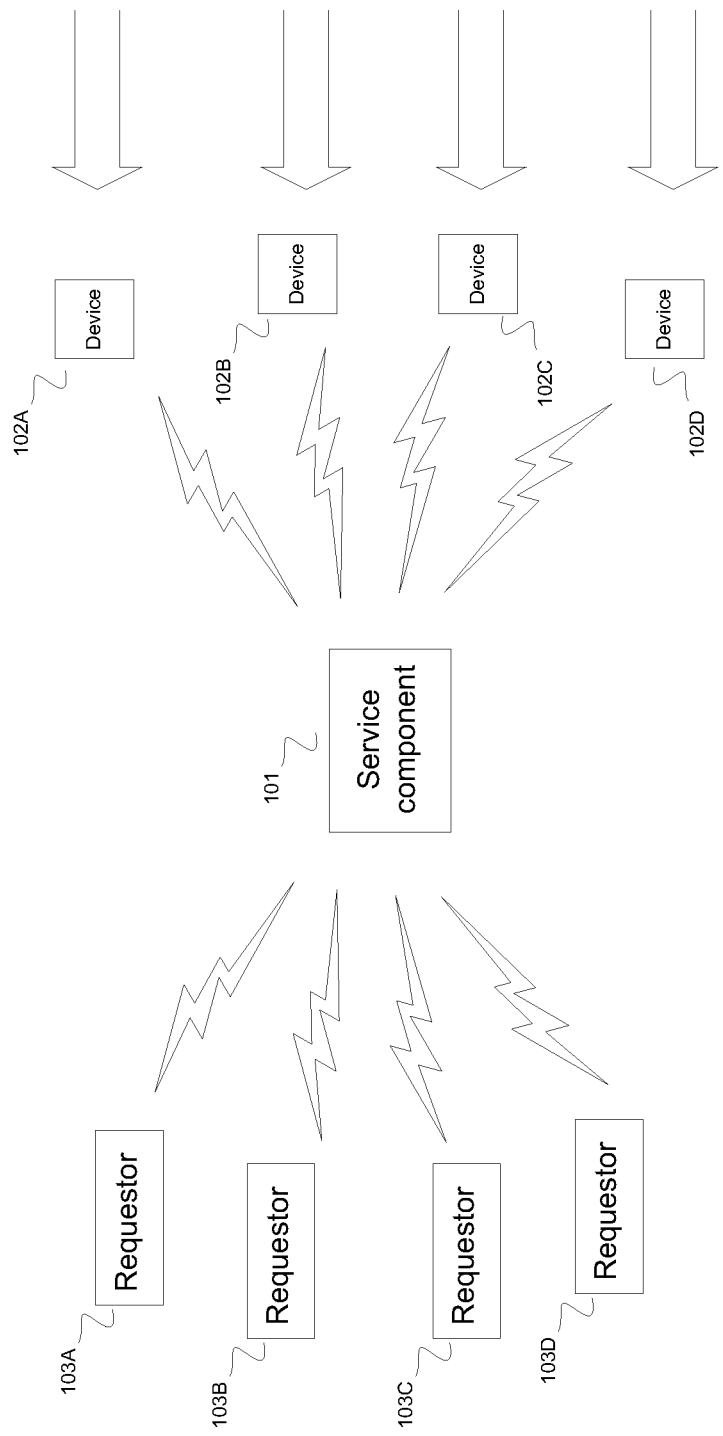
FIG. 1 is a partial block diagram illustrating a network of federated devices.

FIG. 1 is a partial block diagram illustrating an example of a network of federated devices for capturing and/or processing data requested from a requestor. As FIG. 1 illustrates, a requestor 103A, 103B, 103C, 103D may request data from a location of interest. The data may include any data pertaining to the location such as images of the location or an aspect of the location, video of the location, sound, etc. Although four requestors are illustrated in FIG. 1 (Requestors 103A, 103B, 103C, and 103D), any number of requestors may request data. In one example, different requestors may have a different priority such that requests from certain requestors may be serviced prior to other requestors with lower priority. In another example, no requestors are included in the network and data is provided by data capture devices as described below without a request for the data.

The network may include a service component 101 for receiving requests from requestors for data capture and determining devices for providing the requested data. In addition, the service component 101 may store and/or process information corresponding to the devices for data capture or requestor devices and may further determine devices for providing the requested data. The determination of devices may be based, for example, on the information corresponding to the devices stored and/or processed in the service component 101. The service component 101 may also include an image processing component for processing, modifying, manipulating and/or storing image data or other data associated with the requested data.

The service component 101 may determine at least one device for providing the requested data. Any number of devices may be determined to be capable of providing the requested data. Such a determination may be based, for example, on the type of data requested and the characteristics and/or location of the devices. Although FIG. 1 illustrates four devices (102A, 102B, 102C, and 102D) in communication with the service component 101 for providing the requested data, any number of devices may be used.

The service component 101 may also receive location information or other pertinent data corresponding to the devices 102A, 102B, 102C, 102D. The location or other information of the devices may be stored and/or processed in the service component 101 for determining the location of the respective devices (e.g., 102A, 102B, 102C, or 102D). Thus, the requested information from any one of the requesters (e.g., requestor 103A, 103B, 103C, and/or 103D) may be obtained from devices that are selected based on the location of the devices or any other characteristic of the devices. For example, a requestor may request from the service component 101 data captured from a particular location. The service component 101 receives the request from the requestor and determines the location and capabilities of the devices (e.g., device 102A, 102B, 102C, and/or 102D). For devices that are located in or around the requested location that have capabilities of obtaining the requested information, the service component 101 may send a request to those devices for the requested data from the requester. In some cases, the service component 101 may also provide instructions to the devices regarding obtaining the images. For example, the service component 101 may determine an orientation and location of a device and, based on this determination, may instruct the device to point in a certain direction or move to a particular location to obtain the desired image.

Also, the service component 101 may receive the data from the devices and may further process the images. For example, the service component may receive a request for image data from a particular location from a requestor and may determine a plurality of devices for providing the requested image data. The service component 101 may further instruct at least some of the devices in the plurality of devices how to obtain the image data (e.g., which direction to point, distance and direction to relocate, etc.). The devices may receive the request for data and/or instructions on how to obtain the requested data and may obtain the image data and return the data to the service component 101. The service component 101 may receive a plurality of image data from the devices, the plurality of image data being a plurality of images of a common subject matter. In this example, the plurality of images may include images of different aspects of the same subject matter, different angles of the same subject matter, different portions of the same subject matter, different magnifications, different components of a subject matter, different components of related subject matter, different aspects of co-located subject matter, etc. The service component 101 may receive the plurality of images and may process, modify, manipulate, and/or synthesize an image of the requested subject matter from the received images as described in more detail below.

Figure 2:
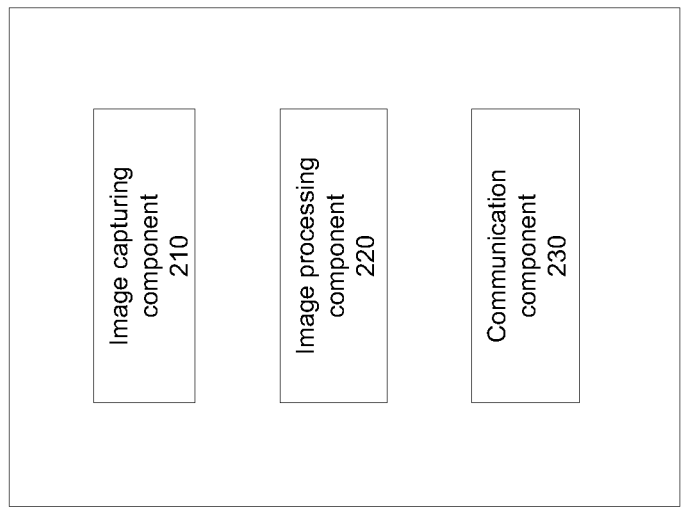
FIG. 2 is a partial block diagram illustrating one example of a service component.

FIG. 2 is a partial block diagram illustrating one example of a service component 101. The service component 101 in this example includes an image capturing component 210 that may receive a request for data capture from a requestor and may determine a device or a plurality of devices for obtaining the requested data capture. The image capturing component 210 of the service component 101 may have additional functions for processing a request for data from a requestor and selecting a device or plurality of devices for providing the data. For example, the service component 101 may receive multiple requests for an image from different locations from different requestors. In one example, the service component 101 may process each of the different requests in a first-come-first-serve manner. However, in another example, the service component 101 may process each of the different requests based on a priority scheme. A priority value may be assigned to each of the requestors so that the service component 101 may service the requests based on which requestor has the highest priority. The priority values may be determined for each of the requestor devices and stored at the service component 101. When multiple requests are received at the service component 101 from multiple requestors, the service component 101 may compare the priority values for each of the requesting requestors and service the request from the requestor with the highest priority first.

The service component 101 may further include an image processing component 220 for processing, modifying, manipulating, or enhancing the requested data received from devices. The service component 101 in this example receives a request for image data from a requestor, determines devices capable of providing the requested data, and instructs the devices capable of providing the requested data to obtain the image data. Optionally, the service component 101 may further instruct any of the devices how to obtain the image data or provide further instructions on additional requirements of the data desired.

The image processing component 220 of the service component 101 may receive the requested image data from the devices and may further process the image data. For example, the image processing component 220 may receive a plurality of images associated with a requested subject matter where each of the images in the plurality of images portrays the requested subject matter from a different angle, a different magnification, different exposure, different component of a subject matter, or a different portion of the requested subject matter, etc. The image processing component 220 of the service component 101 may modify the images as necessary and may further connect the images together to provide a detailed image that encompasses a large portion of the subject matter or substantially all of the requested subject matter. For example, a panoramic, 3-dimensional view of the requested subject matter may be created at the image processing component 220 of the service component 101 based on the images received from the devices. In this example, the image processing component 220 may stitch different images received from the different devices together to create the panoramic and/or 3-dimensional image of the requested subject matter. In addition, images of at least a portion of the requested subject matter may be included such that a requestor may obtain detailed views of at least a portion of the requested subject matter.

Figure 8:
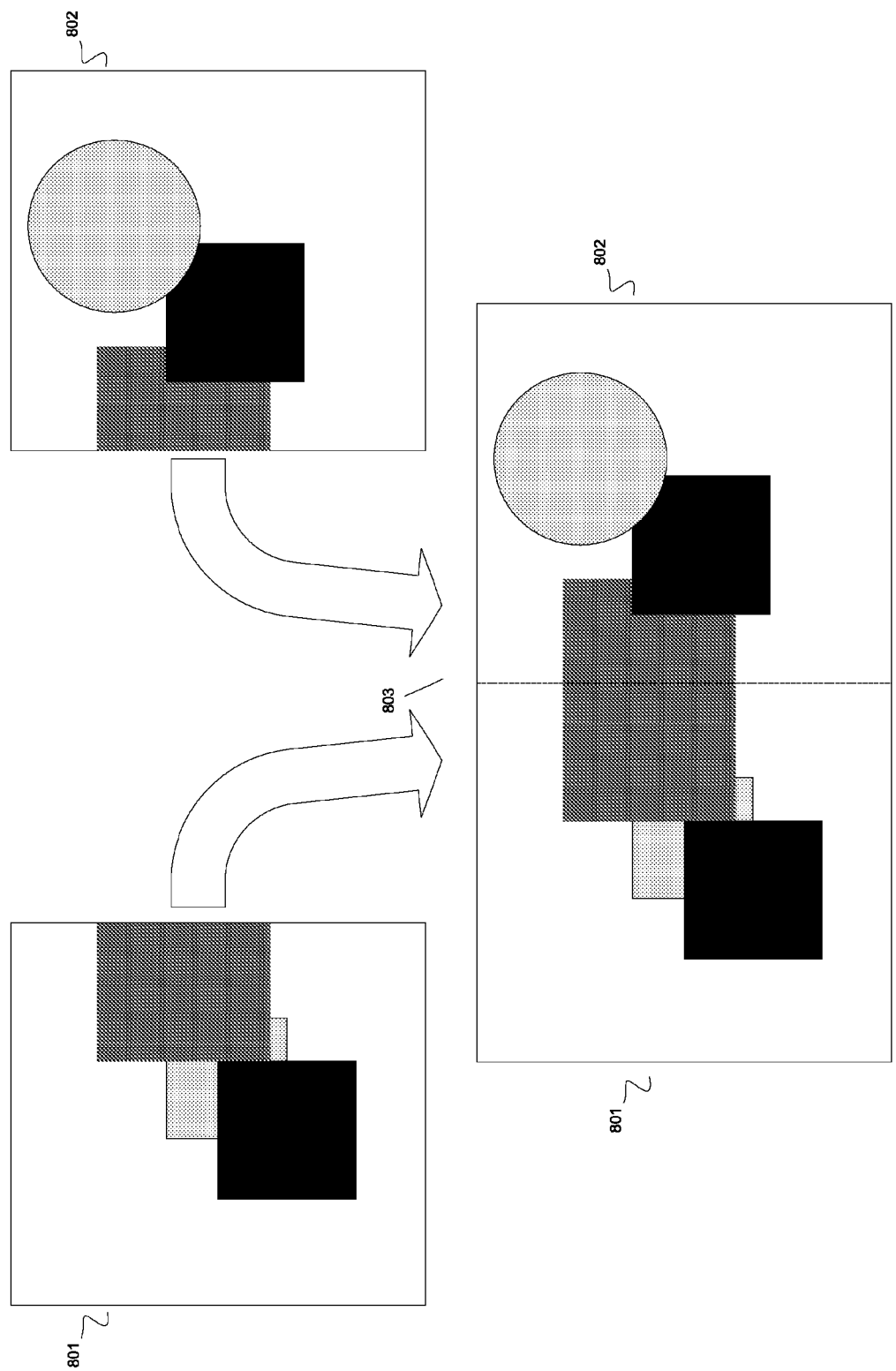
FIG. 8 illustrates an example of processing of a plurality of images received from devices.

FIG. 8 illustrates an example of processing of a plurality of images received from devices. A first image 801 of a subject matter is received at the service component 101 from a first device and a second image 802 of the subject matter is received at the service component 101 from a second device. The first image 801 and the second image 802 in this example represent different portions of the subject matter of interest. The service component 101 may further process the first image 801 and/or the second image 802 such as adjusting the contrast, magnification, brightness, sharpness, etc. As FIG. 8 illustrates, the first image 801 and the second image 802 in this example are connected or stitched together to form a composite image 803. The composite image 803 may be a panoramic, 3-dimensional image of the subject matter as illustrated in FIG. 8.

As an example to illustrate, a requestor may desire an image of the Brooklyn Bridge. The requestor may submit a request for the image to the service component 101 which may receive the request via the image capturing component 210. The service component 101 may further determine a plurality of devices capable of providing the image of the Brooklyn Bridge. For example, the image capturing component 210 may contain a database that stores information on each participating device. The information may include capabilities of the device and/or location of the device. Thus, the service component 101 may further contain a device tracking system for determining the location of each of the devices.

In this example, the service component may identify devices at the Brooklyn Bridge or within a specified distance from the Brooklyn Bridge. In this example, additional devices may be identified that may have a certain vantage point of the bridge even if the devices are not within a specified distance from the bridge (e.g., a device may be included if atop the Empire State Building or World Financial Center or at a coastal vantage point in New Jersey if a special vantage point is determined for obtaining the requested image).

Based on the determination of devices by the service component 101, the service component 101 (e.g., the image capturing component 210 of the service component 101) may send a request to the identified devices. In addition, the service component 101 may further send instructions to the devices for obtaining the image data. As one example, if a device is determined to be located in Brooklyn Heights, the service component 101 may send instructions to that device to point the device westward to capture the data. If a device is determined to have image enhancing capabilities, the service component 101 may instruct that device to activate those capabilities. If a device is determined to be located in Park Slope, Brooklyn such that the user may have to travel a short distance to a location where a desired image may be obtained, the service component 101 may instruct the user of that device where to go, which direction, or further instructions on how to obtain the desired image as well as the desired angle, distance, exposure, magnification, etc. of the image desired.

In another example, the service component 101 may facilitate a transaction between the requestor(s) and the devices for providing the requested data. For example, the requestor may be charged a fee for the requested data while the devices may be paid a fee for providing the requested data. In one example, the requestor may send a request for data to the service component 101 as well as a desired price. The service component 101 may determine devices capable of providing the requested data at the requested price. In this example, the service component 101 may either receive pricing information from the devices in real-time or may have stored information corresponding to each of the devices such that the service component 101 may compare the requested price from the requestor with each of the stored values of the corresponding devices. If a match is determined, then the corresponding device may be included in the request for data.

In another example, the service component 101 may facilitate bidding among the devices for providing the requested data. Any type of bidding or auctions may be implemented (e.g. basic auction, Dutch auction, open market, or multi-unit English descending auction, to name a few). For example, the devices capable of providing the requested data may submit bids corresponding to the fee requested for providing the data. The requestor may select the devices for providing the data based on the fees provided by the different devices (e.g., the requestor may include any device which quotes a fee that is lower than a certain amount). Optionally, the requestor may provide a minimum (or maximum) amount such that devices may be eliminated if the stated fee is out of range. Certain devices may request a fee that is out of range but the requestor may wish to include the devices anyway. There are many reasons for this, for example, a device may have a particularly desirable vantage point and may charge a premium for the data from that vantage point. The requestor may have the option to include devices that quote fees out of range, if desired.

Also, multiple requests may be received from multiple requestors. The service component may determine which requestor to service first based on a priority system. For example, a first requestor may have a high assigned priority value while a second requestor may have a lower assigned priority. In this case, the first requestor would have priority over the second requestor and the request from the first requestor would be processed first. As one example, a first requestor may be an emergency service and may request image data of an accident scene on the Brooklyn Bridge. A second requestor may be a tourist requesting image data of Niagara Falls. If the first requestor (the emergency service) has higher priority than the second requestor (the tourist), then the service component 101 may process the request for images of the accident scene prior to processing the request for Niagara Falls. Certain entities may have a high priority value assigned to them. These entities may include police officers, paramedics or emergency medical technicians, emergency rooms, firefighters, military, government agencies, 911 emergency services, etc.

In another example, a requestor may be capable of "commandeering" the network device for obtaining desired data in an "ultra-high priority" scenario. The requestor may have high priority such that a request from such a requestor may preempt all other requests. An example of one application of the "ultra-high priority" is an emergency service requesting images or other data of an accident or disaster scene. For example, a hurricane may be closely approaching a particular location. An emergency service may desire images or other data of the scene to ensure that the location has been properly evacuated or otherwise prepared for the storm. The emergency service may submit an "ultra-high priority" request for data from the scene. Because the emergency service has ultra-high priority, the service may preempt all other requests and service the request from the emergency service. In one example, a request is received from the ultra-high priority device at the service component 101 which identifies devices capable of providing the requested data. Responsive to the request from the device, the service component 101 may transmit an interrupt command to the identified devices capable of providing the requested data. The interrupt command may interrupt or suspend activity of the identified devices such that the identified devices terminate their current activities, if any, and perform the operations requested by the service component 101.

The service component 101 may further include an image processing component 220 for processing the data received from the devices. In the example of the Brooklyn Bridge, the service component 101 may receive a plurality of images of the Brooklyn Bridge from different devices. Each of the images may be different in that the images may include different portions of the bridge or the images may be at different magnifications. Also, the images may differ in quality, contrast, exposure, distance, etc.

The image processing component 220 may receive the plurality of images of the Brooklyn Bridge in this example, and may optionally modify the images to improve image quality. For example, edges may be sharpened on images that are out of focus or exposure levels may be modified in certain images that may benefit from such modifications. Also, the different images having been obtained by different devices may vary in color, exposure, etc. The image processing component 220 may modify the images such that the images may be compatible with each other in terms of technical quality.

Also, the image processing component 220 may connect or stitch together different images of different portions of the Brooklyn Bridge to create a panoramic 3-dimensional view of the bridge. In addition, certain detailed images of smaller aspects of the bridge may be included if additional details are desired. As an example, if an accident has occurred on the Brooklyn Bridge, more detailed images (e.g., close-up images of the accident scene at different angles and magnifications) may be included in the plurality of images obtained from the devices. These detailed images may be based on additional images received from devices providing the detailed images. For example, motorists and/or passersby at the scene of the accident may provide images of the accident scene on the bridge. In this example, a requestor may receive a panoramic, 3-dimensional view of the Brooklyn Bridge and may further be able to navigate around the location via the panoramic image derived from the multiple images received from the plurality of devices. Also, a requestor may select a portion of the panoramic view of the Brooklyn Bridge such as the accident scene on the bridge and may enlarge the view of the accident scene to obtain a detailed 3-dimensional view of the accident scene on the bridge. In the example in which the requestor is emergency personnel, the requestor may determine by navigating through the scene the extent of the accident, potentially life-threatening conditions, or may determine a course of action of deployment.

The data received from the device may also be stored for future analysis, if desired. Devices in a network may return data, such as image or audio data, from a scene of interest. The data may be stored in memory. The data may also be stored with identifying information corresponding to the data. For example, the data may be stored with a description of the scene, a precise location of the scene, a date and time that the image was taken, or any other pertinent information associated with the data. The data may thus be fully analyzed along with ancillary information associated with the data.

Also, the data may be stored and later accessed to create a virtual reality environment. Multiple devices provide information of a subject matter which may be pooled to create in-depth information of the subject matter. As an example, multiple devices may provide image data of a particular subject matter from different angles and perspectives. This information may be assembled to create a virtual reality environment. Thus, the present description is not limited to any single use of the received data as the data generated by the service may be used in a variety of ways.

Figure 9:
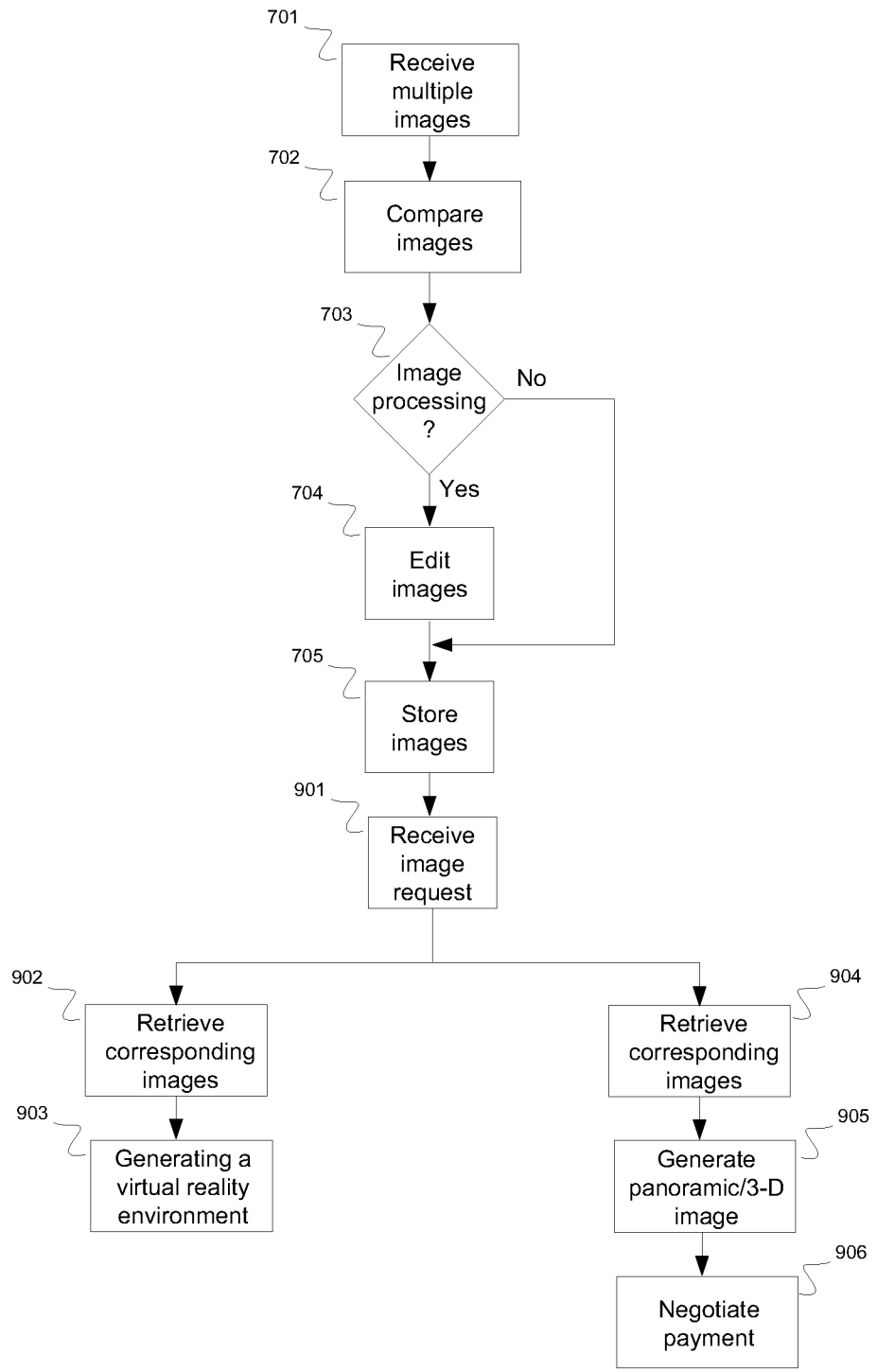
FIG. 9 is a flowchart illustrating an example of generating requested information from captured data.

FIG. 9 is a flowchart illustrating an example of generating requested information from captured data. The method of FIG. 9 is similar to the method of FIG. 7. Multiple images are received at the service component (STEP 701 and compared (STEP 702). Image processing of the received images may be performed (STEP 703) including editing of the images (STEP 704). By editing and otherwise processing the images (STEPS 703, 704), the images may be brought into mutual conformity, if necessary or if desired. In the method illustrated in FIG. 9, the images are stored (STEP 705) for subsequent retrieval.

If a requestor requests the image information (STEP 901), the service component retrieves the requested images stored in memory (STEPS 902, 904) based on the request received from the requester. Hence, the requested image data is identified in memory and retrieved for delivery to the requester. Also, the retrieved image data may be further processed in many ways, As one example in FIG. 9, the retrieved images may be assembled to generate a virtual reality environment (STEP 903) as described above.

In another example, owners or users of network devices for capturing data may provide the data without a specific request for the data. In this example, a owner or user of a network device may observe an object, entity, or event of interest. Even if a request for the entity is not received by the owner/user of the network device, the owner/user may nevertheless obtain data of the entity. For example, the owner/user may capture an image of the entity and upload the image to the service. The service component 101 receives the image and stores the image for potential later use. Also, the owner/user of the device may send descriptive information or other relevant information pertaining to the image to the service component 101. This information may include, for example, location, time, date, angle, orientation, or other descriptive information of the subject matter in the image provided. This information may also be stored at the service component 101 with the corresponding image data.

FIG. 9 also illustrates an example in which requested information is retrieved from storage at the service component and stitched together to create a panoramic and/or 3-dimensional image. The requested information may be pre-stored in storage or may be obtained in real-time. In the example illustrated in FIG. 9, the information is pre-stored in memory and retrieved when requested by a requester. However, the data is captured at a time prior to receiving a request from a requestor for the data.

After generation of the image, the service component may further negotiate payment for the image(s). In negotiation of payment, if desired, the owner/user of the network device may provide a price quote with the image data to indicate a price the owner/user is willing to accept for providing the image data. In addition, other owners/users of network devices may provide similar image data of the subject matter along with any additional descriptive information or pricing information. If a requestor requests an image of the subject matter, the service component 101 may provide the information to the requestor which may include price of the image. The requestor may determine if he is willing to pay the requested price or may provide a counteroffer. The service component may further mediate a negotiation for image or other data between a requestor and provider(s) of the data.

In another example, data may be received from federated devices at different times. A particular subject matter may thus be imaged or otherwise captured at various different times. This data may be returned to the service component 101 where it may be stored along with the time indicator or indication. The time indicator or indication corresponds to a data capture time of the image such that the time at which the image was captured may be known. A requestor may wish to receive data of a particular subject matter at a particular time. When the requestor requests data of a subject matter at a specified time (e.g., sends a request for an image that includes a data capture time), the service component 101 determines available information corresponding to the requested time and subject matter. For example, a requestor may wish to receive image data of an accident scene that occurred at a particular location 3 days prior. The service component 101 identifies stored image data corresponding to the accident scene at the specified time and assembles the requested image data by connecting or stitching together the relevant images. Thus, the requestor may receive transmitted images that indicate a short term evolution of a subject matter. In this example, the requestor receives images over time of an accident scene, the images depicting the course of development or evolution of events during the accident over the period of time.

Also, images may depict development or evolution of events for a long-term event. One example of images indicating long-term evolution of the course of a subject matter or event is a large-scale construction project. For example, a requestor may request images of the construction of a skyscraper over a long-term time course. Images may have been collected from data capture devices of the construction project over the time period during which the construction project was being performed. These images may be retrieved and transmitted to the requestor. Also, images captured at about the same time may be stitched together to generate a panoramic or 3-dimensional image of the construction project. Such synthesized images may also be transmitted to the requestor.

Thus, multiple images taken at different times of a subject matter of interest may be captured and stored at the service component 101. The multiple images may be obtained from any number of federated devices in a network. Each of the images may be stored with a corresponding time indication or indicator for indicating the time or date that the image was captured. The time indication or indicator may take many forms. For example, the indicator may be a time-stamp or a data field for indicating the time or date. Any indicator capable of indicating the time of data capture may be used.

A requestor may thus request images or other data of subject matter of interest at a specified time. In this example, a requestor submits a request for data of a particular entity in which the request also includes a time or date. The service component 101 identifies data corresponding to the requested data from the requester. As one example to illustrate, the requestor may submit a request for an image of a particular building at 10:52 PM the previous night. The service component 101 accesses a database of images and extracts images matching the requested criteria. The images thus obtained are stitched together at the service component 101 and otherwise processed as described above to generate a panoramic and/or 3-dimensional image of the requested building at the requested time/date.

Figure 10:
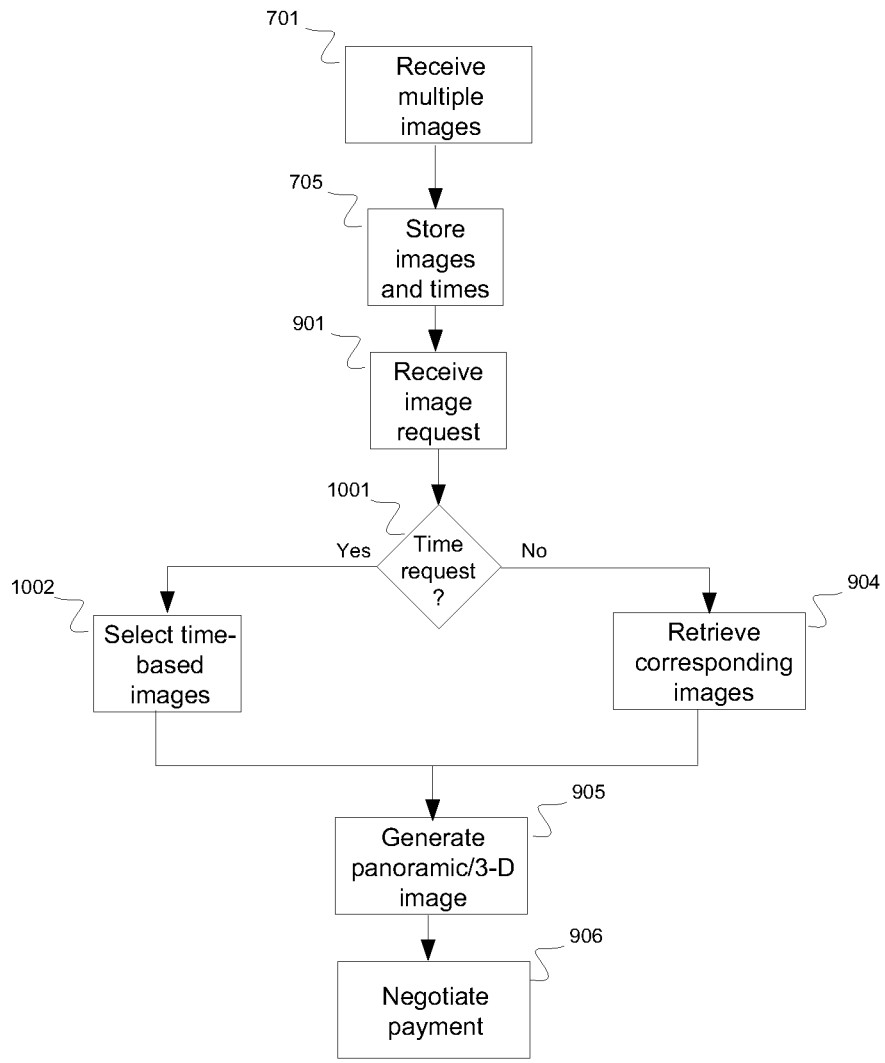
FIG. 10 is a flowchart illustrating another example of generating image data from data capture network devices based on a specified time.

FIG. 10 is a flowchart illustrating another example of generating image data from data capture network devices based on a specified time. In this example, multiple images of a particular subject matter may be received from data capture network devices (STEP 701) and stored (STEP 705). The captured data may be stored in memory with an associated time of capture (STEP 705). When a request for image data of the subject matter is received from a requestor (STEP 901), the service component may access a database in which the previously captured data is stored and retrieve the requested image data ("NO" branch of STEP 1001 and STEP 904). If the request from the requestor further includes a time at which the images are to be captured ("YES" branch of STEP 1001), then the service component selects images from the images retrieved from the database that correspond to the requested time. For example, if the request for a particular subject matter further specifies that the images must be captured at 2:06 AM on a particular date, then the service component identifies those images of the subject matter that were captured at 2:06 AM on the specified date.

The service component 101 may further process the selected images (of the requested subject matter and captured at the requested time/date) by generating a panoramic or 3-dimensional image (STEP 905). The selected images may include images of different portions, components or sections of the requested subject matter and may be stitched together to create the panoramic or 3-dimensional image of the subject matter (STEP 905). The service component may further negotiate for payment of the images (STEP 906) as previously described.

Data over a time period of a particular entity, object or event may also be generated and provided. An owner/user of a data capture device in a federated network may capture data of a particular entity or event, for example, and may send the captured data to the service component 101 with an indication of the time/date the data was captured. Also, the device or another device in the network may capture additional data of the entity or event at a subsequent time. This process may be repeated any number of times with any number of devices to obtain multiple instances of data capture of the entity or event over a period of time. Any of the devices may specify a price or price range for the images. The price or price range may also vary depending on the age of the images. For example, if a request for the image is processed within a predetermined period of time of the date/time of capture, one price may be quoted but if the request for the image is processed a greater period of time after the data/time of capture, a different price may be specified.

The service component 101 may store the captured data and may provide images of the entity or event over time to a user or requestor. As an example to illustrate, a user/requestor may request image data from an accident scene and may further request the images over time such that the images returned depict the evolution of the accident. The service component 101 identifies image data corresponding to the requested accident scene over the desired period of time. Images captured at the same date/time reflecting different aspects, portions, or components of the scene may be connected or stitched together to generate a panoramic and/or 3-dimensional image at that date/time. A price may be quoted for the requestor based on the stated prices or price ranges from the data capture devices. The requestor may accept the quoted price or price range or may provide a counteroffer. The service component 101 may thus mediate negotiations of the purchase of requested image data.

Thus, in this example, the requestor may receive multiple images of an entity or event of interest including panoramic and/or 3-dimensional images formed by stitching together images of the subject matter of interest.

Figure 11:
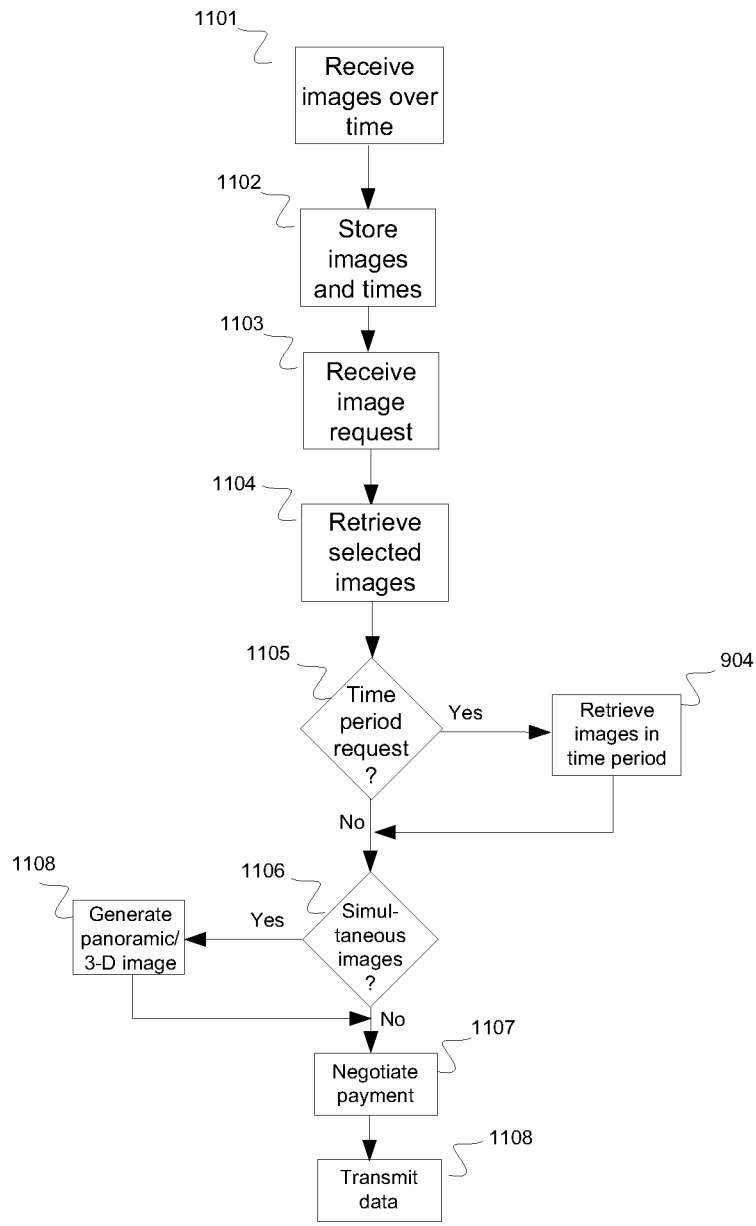
FIG. 11 is a flowchart illustrating an example of providing image data to a requestor based on timing of the images.

FIG. 11 is a flowchart illustrating an example of providing image data to a requestor based on timing of the images. Data may be captured by network devices even without a specific request from a service component. The captured data is returned to the service component that stores the received data. For example, an event may have occurred and a device or devices at the scene may be used to capture various images of the event. The images may include images of different components, portions or angles/perspectives of the events. Also, the images may include images taken at different times during the event. Hence, the returned images may include not only different images of different portions of the subject matter, but also images taken at different times throughout a period of time.

The received images may be stored (STEP 1102) with corresponding times of data capture for each of the stored images. Thus, images may be retrieved from memory with an indication of when each image was captured or obtained.

A request may be subsequently received for the subject matter (STEP 1103) and, responsive to receiving the request, the service component may retrieve the selected images (STEP 1104). The request from the requestor may also include a specified time period of interest ("YES" branch of STEP 1105). For example, a requestor may request images of a particular event and also specify a time period over which images of the event are desired. Responsive to the request and the time period request, the service component retrieves the images of the desired subject matter within the specified time period (STEP 904).

Some of the retrieved images may include simultaneous images of the subject matter of interest ("YES" branch of STEP 1106). In this case, there may be a plurality of images of the subject matter of interest that were taken at the same time. Images taken at the same time may be pieced together or stitched together (STEP 1108) to form a panoramic and/or 3-dimensional image of the subject matter. For example, multiple images taken at the same time of a subject matter may include images of different portions or different components of one entity. In this case, the images may be stitched together to form a single panoramic image of the entity.

If the retrieve images are taken at different times but within the specified time period, then the images may be sent to the requestor (STEP 1108). Also, the panoramic and/or 3-dimensional image may be transmitted to the requestor (STEP 1108). Also, the service component may negotiate for payment of the image data by the requestor (STEP 1107) as described above.

The service component 101 may further include a communication component 230 for providing communication between devices and between a requestor and the devices at the scene. For example, the service component 101 may communicate information, commands, data, or other transmission from the requestor to the devices or from one device to another device to provide instructions to individuals at the scene. In one example, a requestor may be emergency services and may receive a requested panoramic or 3-dimensional image of the Brooklyn Bridge, including an image of an accident on the bridge. Emergency services may navigate through the panoramic image of the bridge and may further enlarge a detailed 3-dimensional image of the accident scene. After navigating through the accident scene, emergency services may communicate instructions via the communication component 230 of the service component 101 to devices at the scene. For example, emergency services may instruct individuals at the scene to administer first-aid or perform other services pending the arrival of emergency personnel.

Figure 3:
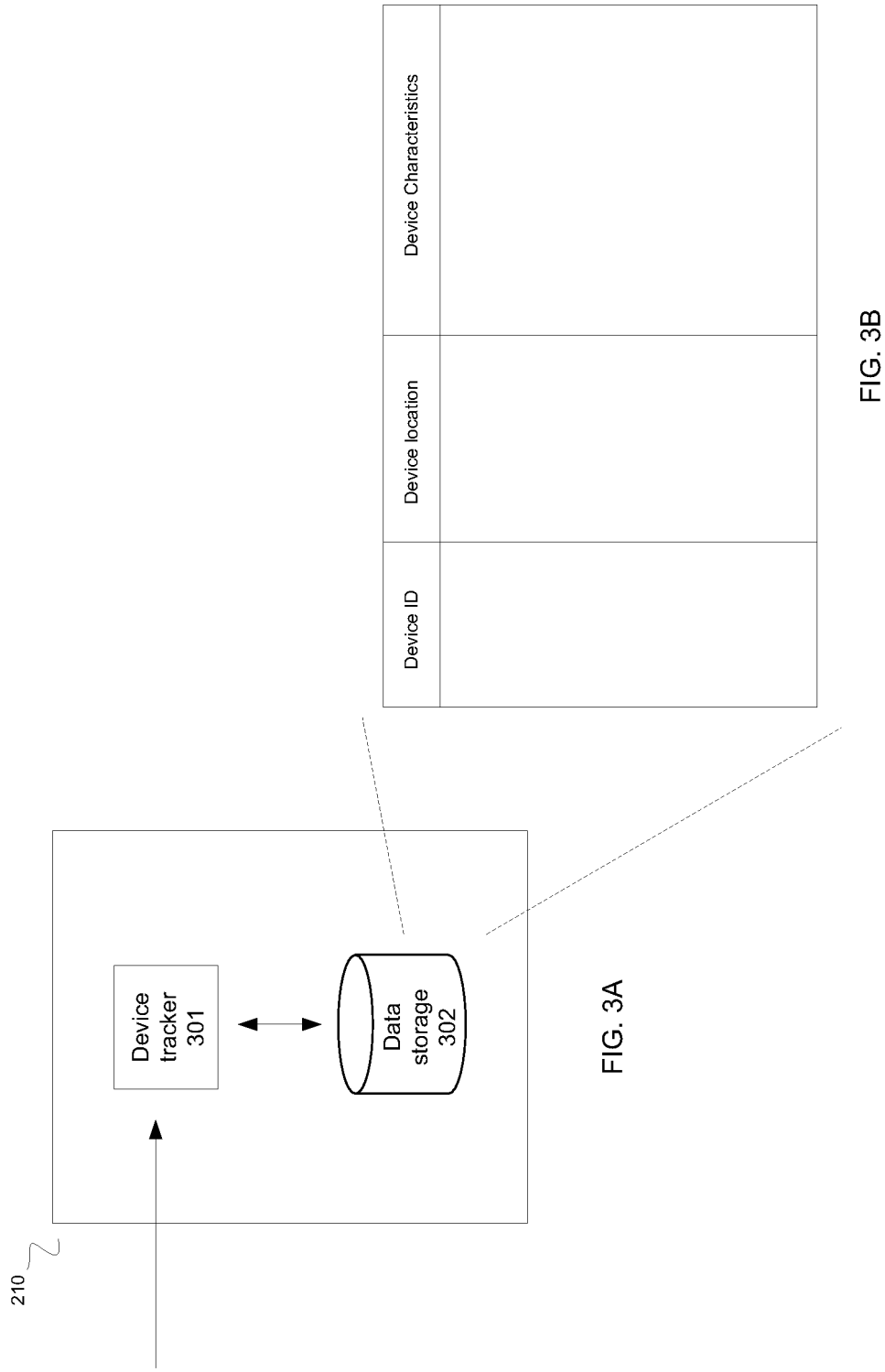
FIG. 3A is a partial block diagram illustrating an example of the image capturing component.
FIG. 3B illustrates an example of device information stored in data storage.

FIG. 3A is a partial block diagram illustrating an example of the image capturing component. In this example, the image capturing component includes a device tracker 301 for tracking the location of devices. The location of devices are received and updated at the image capturing component 210 periodically or continuously such that the location information of the devices is current. The location of each of the devices may be stored in data storage 302 and may be updated as needed when new location information for the devices is received at the device tracker 301.

FIG. 3B illustrates an example of device information stored in data storage 302. In this example, each participating device may have an identifier or Device ID. The device ID may be used to identify the individual devices for obtaining requested data. In addition, the corresponding location of each of the devices may be stored corresponding to the associated device ID. Also, additional characteristics or capabilities of each of the devices may be received via the device tracker 301 and stored in data storage 302 as illustrated in FIG. 3B. The data storage 302 may store the device information (e.g., location and capabilities or characteristics) and may compare the location and capabilities of each of the devices to the request from the requestor. The service component 101 may further select devices for providing the data based on the device location and characteristics/capabilities.

Figure 4:
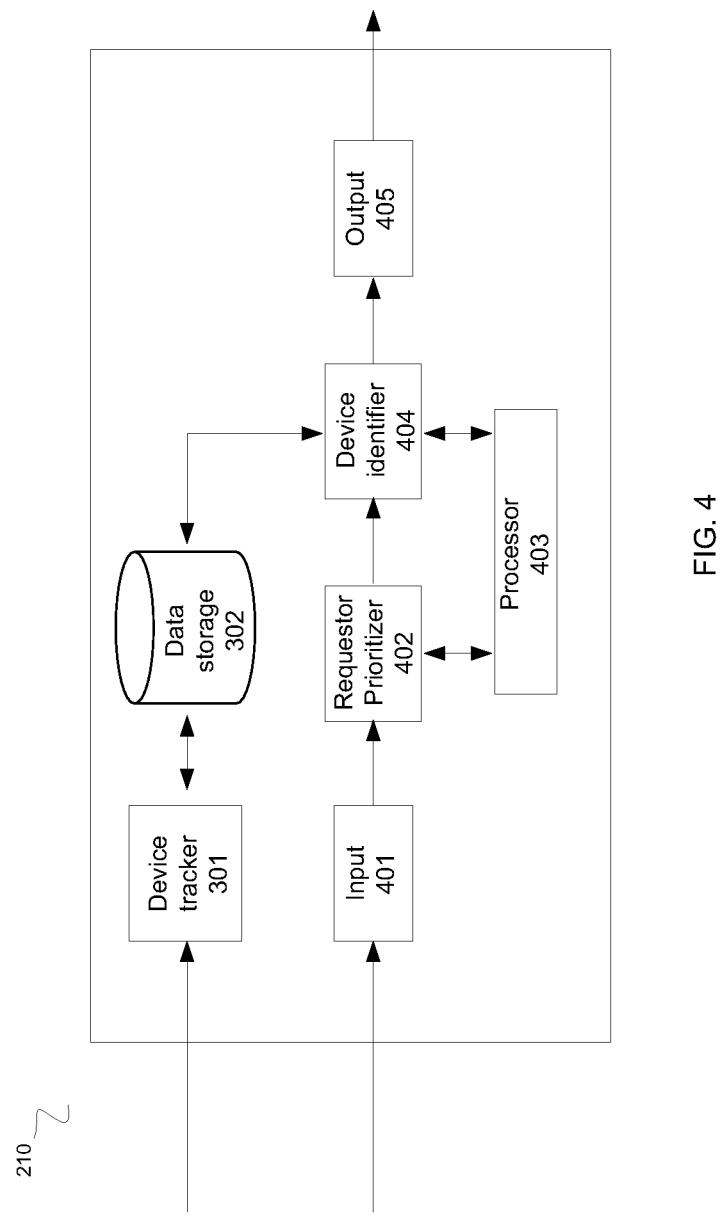
FIG. 4 is another partial block diagram of an example of the image capturing component.

FIG. 4 is another partial block diagram of an example of the image capturing component. In this example, the image capturing component 210 has the device tracker 301 and data storage 302 as described above. In addition, the image capturing component 210 contains an input 401 for receiving a request from a requestor (not shown). The request may be further processed via the processor 403 and a requestor prioritizer 402. In one example, the requestor prioritizer 402 determines a priority of the requestor and assigns a corresponding priority value to the requester. The identity of the requestor with the corresponding priority value may be used to determine the order of processing of requests for data capture. A requestor with a high priority may have priority over a requestor with a low priority.

The image capturing component 210 illustrated in FIG. 4 further includes a device identifier 404 for identifying devices capable of providing the requested data. The processor 403 may control the device identifier 404 to select devices matching criteria for providing the requested data. The device identifier 404 may access the data storage 302 to obtain information on the devices. For example, the device identifier 404 may obtain location information of the devices such that devices located within a predetermined distance from the requested site may be selected as devices for providing the requested data. Also, devices may be selected based on other characteristics or capabilities such as, for example, capabilities of the devices, special features of the devices, availability of the devices, reliability of the devices, etc.

After devices are identified for providing the requested data, the image capturing component 210 may output a request via the output 405 to the devices for obtaining the requested information. Also, the image capturing component 210 may transmit further instructions or information to the devices via the output 405 such as instructions on how to obtain the desired images.

Figure 5:
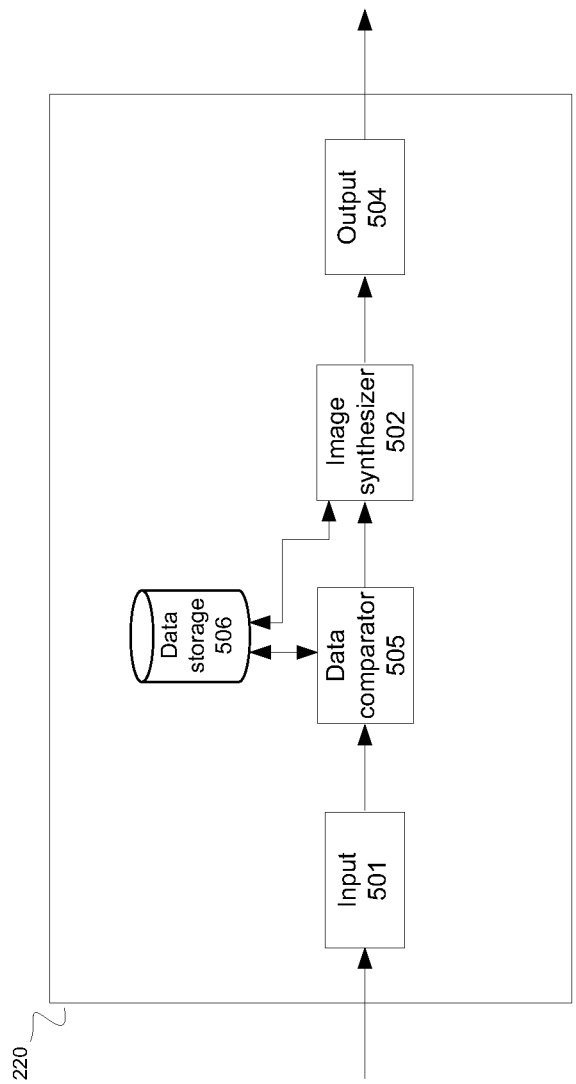
FIG. 5 is a partial block diagram illustrating an example of an image processing component.

The devices obtain the requested information and transmit the data back to the service component 101. The service component may further include an image processing component 220 for processing or manipulating the images. FIG. 5 is a partial block diagram illustrating an example of an image processing component 220 of the service component 101. Data captured by the devices may be received at an input 501. The data may be any type of requested data such as image data, video data, audio data, etc. For example, image data may be received from a plurality of devices at input 501 and may be compared by data comparator 505 of the image processing component 220. The data comparator 505 may extract coordinate data or other features of each of the images received. Based on the data extracted, the data may be stored in data storage 506 and/or synthesized with other images received via input 501.

For example, multiple images may be received of a particular location or a particular scene at a particular location. The multiple images are compared and processed in the data comparator 505. Areas of overlap and congruency in the multiple images are determined such that the images may be further processed in the image synthesizer 502, which connects the multiple images together to produce a seamless panoramic, 3-dimensional view of the location. The 3-dimensional image is transmitted to the requestor via output 504.

Figure 6A:
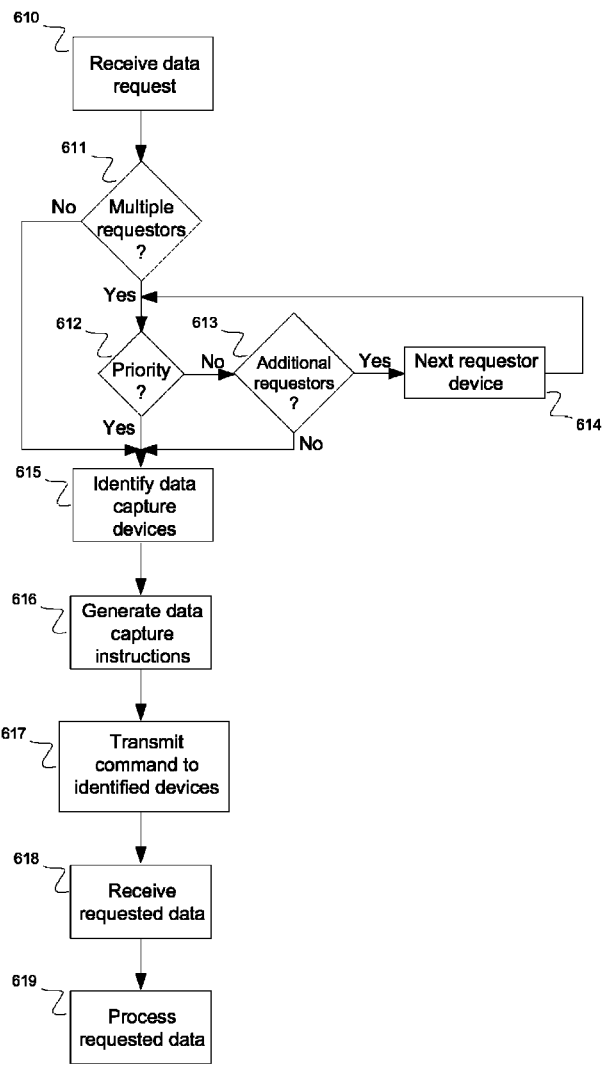
FIG. 6A is a flowchart illustrating an example of a method for providing data to a requesting device.

FIG. 6A is a flowchart illustrating an example of a method for providing data to a requesting device. In STEP 610, a request for data is received at the service component 101. Requests for data may be received from a plurality of requestors ("Yes" branch of STEP 611), each of the requestors having a priority value. The priority values of each of the requestors is compared. If a requestor does not have priority ("No" branch of STEP 612), then the priority value of other requestors are examined ("Yes" branch of Step 613 and STEP 614). The request from the requesting device with the highest priority is processed first ("Yes" branch of STEP 612). If only one request is received from a single requestor ("No" branch of STEP 611), then the request is processed for that requestor.

In processing the request, the service component 101 identifies devices capable of providing the requested data (STEP 615). This identification may be based on stored location data or stored information on capabilities or characteristics of the devices. For example, a device that has capabilities of capturing an image (e.g., camera) may be selected if a photograph is desired. Also, information corresponding to the location or capabilities of the devices may be updated in memory at the service component 101.

The service component 101 may further generate instructions for data capture for the devices (STEP 616). For example, the service component 101 may determine that a device is capable of providing the requested data and may also desire a particular view of an image of the desired subject matter. The service component 101 in this example generates instructions and transmits the generated instructions to the device to orient the device in a particular position to obtain the desired image and transmit the instructions to the device (STEP 617).

The devices receive the request for data and capture the requested data according to the instructions provided by the service component. Optionally, the service component 101 may facilitate bidding between the devices and the requestor as described above. After capturing the requested data, the devices transmit the captured images to the service component (STEP 618). The service component 101 receives the images from the devices and processes the images (STEP 619) for transmission to the requester.

Figure 6B:
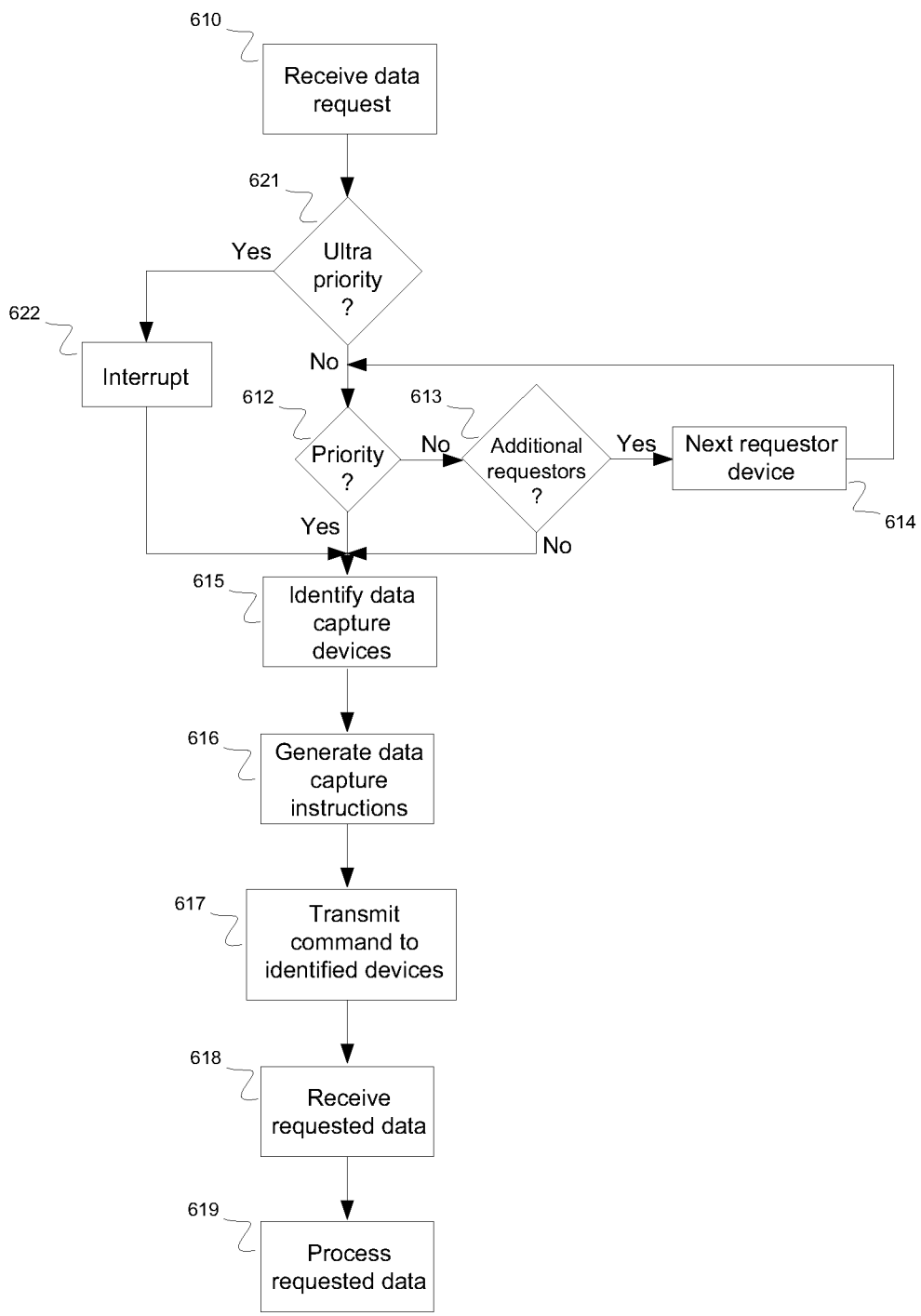
FIG. 6B is a flowchart illustrating an example of a method for providing data to a requesting device.

FIG. 6B is a flowchart illustrating another example of a method for providing data to a requesting device. In this example, a data request is received from a requestor as in the method of FIG. 6A (STEP 610). The service component 101 may receive the request and, responsive to the request, may access a database to determine if the requesting device is an ultra priority device (STEP 621). An example of an ultra priority device includes an emergency service or government agency such as the Federal Emergency Management Agency (FEMA). If the requesting device is an ultra priority device ("YES" branch of STEP 621), then the service component 101 services the request of the device (STEPS 615-619). Also, the service component 101 may send an interrupt (STEP 622) to devices identified as capable of providing the requested data to suspend current activity of the devices. Thus, the identified devices terminate other actions (at least temporarily) to perform the requested actions. If other requests have been received from other requestors where the other requestors are not ultra priority devices, then the request from the ultra priority device usurps the other requests such that the request from the ultra priority device is serviced out of turn and in front of the other requests from other requestors. The request is serviced similar to STEPS 615-619 of FIG. 6A.

If the requesting device is not an ultra priority device ("NO" branch of STEP 621), then the request from the requesting device is serviced based on the priority system as described in FIG. 6 (STEPS 612-614). Thus, in one example, the system may be "commandeered" by the ultra priority requestor.

Figure 7:
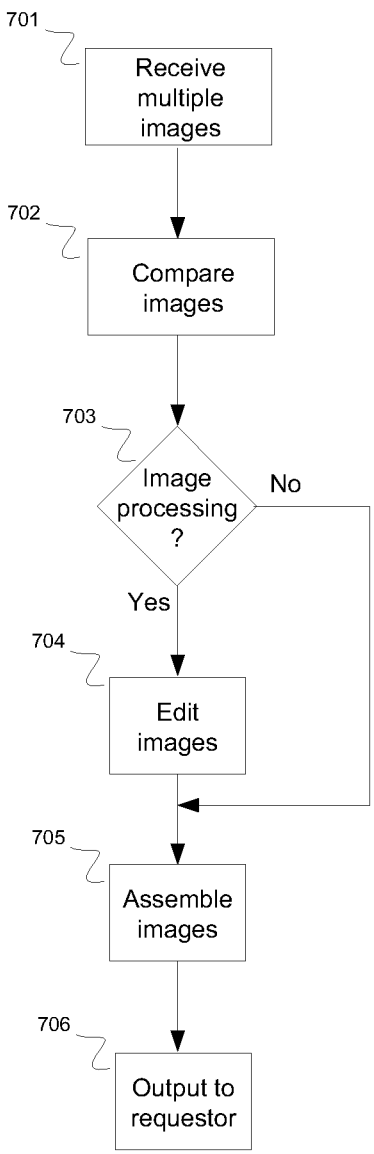
FIG. 7 is a flowchart illustrating an example of processing of images at a service component.

FIG. 7 is a flowchart illustrating an example of processing of images at the service component 101. IN STEP 701, the service component 101 receives the requested images from the devices. There may be many images of the subject matter of interest and each of the images may vary from the other images in terms of which portion of the subject matter each image represents, angle, resolution, or magnification of the subject matter. In addition, the images may differ in exposure, contrast, brightness, or any other technical quality. In STEP 702, the images are compared to each other (STEP 703). Based on the comparison, the images may be determined to be compatible to form a single image. Alternatively, it may be determined that further processing of at least some of the images may be needed to correlate the different images.

When image processing is determined to be desired ("YES" branch of step 703), the corresponding images determined to benefit from further processing are edited (STEP 704). For example, if an image is determined to be underexposed as compared to the other images, the image may be modified by image processing methods to increase the brightness of the image to match the other images. In this way, the underexposed image is modified so that the image conforms with the other images. If the received images are determined to be in conformity with each other ("No" branch of STEP 703) or after any image with inconsistent technical qualities are modified accordingly, the images may be assembled to create a composite image that includes the received images connected together (STEP 705).

For example, the requested image may have been of subject matter that is large, for example, the Grand Canyon. With a single photographic image of the Grand Canyon, it is likely that the single image will include only a small portion of the site. However, in this example, multiple images of the site are received (e.g., STEP 701). These images may be received from multiple devices that are identified as capable of providing the desired images of the Grand Canyon. The devices may be located in proximity to the site and may be identified as devices having photo-imaging capabilities (e.g., having a camera).

The images received from the identified devices are compared and further modified, if desired (STEPS 702-704).

Also, the images may include different portions of the Grand Canyon. As the number of different images increases, the depth and scope of the coverage of the site increases. The images of the different portions of the Grand Canyon are assembled together (STEP 705) to create a panoramic image of the canyon. The requestor, after receiving the panoramic image (STEP 706), may navigate through the 3-D image as if actually moving through the site. If close up images of certain points of interest are included in the returned images from the data capture devices, the requestor may further enlarge those regions, if desired, to obtain a more detailed image of the enlarged regions, the detailed images corresponding to the close up images received from the data capture devices.

Also, the requestor or any other party may transmit further instructions to devices and persons at the scene. After navigating through the scene and analyzing the conditions at the scene, the requestor (or other party) may transmit instructions back to the devices. Hence, the system may further include a communication device for providing two-way communication between the devices, the requestor, or any other party. This may be beneficial, for example, in an emergency situation (e.g., accident scene, crime scene, etc.) in which after a survey of the scene, emergency personnel (e.g., paramedics, police officers, firefighters, etc.) may further instruct persons at the scene via the data capture devices on what immediate actions to take.

Similarly, the service component 101 may determine that devices are capable of providing requested data and may instruct users of the devices to deploy the devices to capture the desired images. For example, the service component 101 may determine that multiple devices are present at a conference and may be capable of providing requested image data from the conference. The service component 101 may send instructions to each of the devices to coordinate data capture among the devices in order to capture the conference.

In another example, the devices for providing the data may include video-capable and/or audio-capable devices such that video and audio may also be provided to the requestor. For example, the data capture devices may be sensors that are video-capable and may each provide a video of desired subject matter. As one example, individuals with video-capable devices may be participating in a conference. Each participating individual may arrange his/her respective video-capable device to capture the conference. Each individual video capture may be returned and may be assembled together to provide video coverage of the conference to a remote requestor. Thus, video images from each of the video-capable devices may be stitched together to form a panoramic video image or a 360 degree video image of the conference in this example.

Similarly, the data capture devices may be capable of providing audio information. For example, multiple users with audio-capable devices may be attending a speech or conference. Each of the audio-capable devices may capture the audio portion of a speaker at the conference and provide the captured audio data to a requestor. The audio data returned from the devices contains the audio data of an audio source (e.g., a speaker at a conference) collected from different orientations, directions and distances from the audio source. Hence, the collected audio data from the audio-capable devices may be used to determine the location of the audio source (e.g., speaker) or used in identifying the audio source.

In addition, the data captured by the devices may be used in scene modeling. For example, multiple users and devices may be attending a sporting event. A requestor may desire image, video or audio data of the sporting event (e.g., for real-time game analysis). The devices may capture images or video from the sporting event which may be calibrated and assembled or stitched together to provide a 3-dimensional image or video image of the sporting event. Hence, automatic 3-dimensional scene reconstructions from image or video sequences may be obtained. Real-time game analysis may be performed based on the scene reconstructions in this example.

Also, different data capture devices may be partitioned to provide a particular aspect of the requested data. Requested subject matter may include different aspects or different components of which images are desired. For example, a building may contain different sides (e.g., front side, back side, left, right, top view, etc) or images of a sporting event such as a baseball game may include different parts of the field or stadium.

Multiple data capture devices may be present at the desired site or in the vicinity of the desired site. For example, if the desired subject matter is a building, a first group of devices may be located at the front of the building, a second group of devices may be located at the back of the building, a third group of devices may be located at the right side of the building, a fourth group of devices may be located at the left side of the building and a fifth group of devices may be located above the building (e.g., in a plane or in a tree overhanging the building). A service component 101 may determine the locations of each of the data capture devices and may partition the devices to provide a particular aspect of the building. In this case, the first group of devices may be requested to provide images of the front aspect of the building, the second group of devices may be requested to provide images of the back aspect of the building, etc. Each of the devices may provide the requested image of the requested corresponding aspect of the subject matter to enhance the scope of the final synthesis of the image. In this example, a 3-dimensional image of the building may be provided which includes images of each aspect of the building.

In another example, a computer-readable medium having computer-executable instructions stored thereon is provided in which execution of the computer-executable instructions performs a method of providing an image of requested subject matter as described above. The computer-readable medium may be included in a system or computer and may include, for example, a hard disk, a magnetic disk, an optical disk, a CD-ROM, etc. A computer-readable medium may also include any type of computer-readable storage media that can store data that is accessible by computer such as random access memories (RAMs), read only memories (ROMs), and the like.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A method of generating a composite image of a subject from a first image and a second image, the method comprising:

receiving, by a service component operating on a computing device, a request for the composite image of the subject;

selecting, by the service component in response to the receiving the request, a first device from a plurality of devices, the selecting the first device based on stored device information that indicates that the first device is configured to provide at least a first portion of the requested composite image, the first portion corresponding to the first image of the subject, wherein data storage includes the stored device information for each of the plurality of devices including for the first device and the second device, and wherein each stored device information comprises a DeviceID that identifies a corresponding device, and a geographic location of the corresponding device, and other characteristics of the corresponding device, and wherein the geographic location of each device in each corresponding stored device information is updated by a device tracker;

selecting, by the service component in response to the receiving the request, a second device from the plurality of devices, the selecting the second device based on the stored device information that indicates that the second device is configured to provide at least a second portion of the requested composite image, the second portion corresponding to the second image of the subject;

transmitting, in response to the selecting the first device, a first request to the first device for the first image of the subject;

transmitting, in response to the selecting the second device, a second request to the second device for the second image of the subject;

receiving, in response to the first request, the first image of the subject from the first device and, in response to the second request, the second image of the subject from the second device; and synthesizing, in response to the receiving the first image of the subject and the second image of the subject, the requested composite image of the subject based on the first image of the subject and second image of the subject.

2. The method of claim 1 wherein receiving the request for the composite image of the subject comprises:
receiving a plurality of requests from a plurality of requestors, each of the requestors having a priority value.

3. The method of claim 2 further comprising selecting a request from the plurality of requestors based on the priority value of each requestor, wherein the selected request is the request.

4. The method of claim 1 wherein the selecting the first device comprises determining a location of the first device based on the location in the stored device information corresponding to the first device.

5. The method of claim 4 wherein the selecting the first device comprises selecting the first device if the location of the first device is within a predetermined distance of the subject.

6. The method of claim 4 further comprising:
receiving location information for the first device;
storing the location information for the first device, wherein the stored location information is a portion of the stored device information of the first device; and
selecting the first device by comparing the location of at least one other device with the location of the first device.

7. The method of claim 1 wherein the first request includes one or more instructions specifying how to capture the first image of the subject.

8. The method of claim 7 wherein the one or more instructions specifying how to capture the first image of the subject includes an instruction to move the first device.

9. The method of claim 8 wherein the instruction to move the first device indicates a direction for the first device to point to capture the first image of the subject.

10. The method of claim 1 wherein the received first image of the subject is from a different viewing angle than the received second image of the subject.

11. The method of claim 1 wherein the composite image of the subject is a 3-dimensional image of the subject.

12. The method of claim 1 wherein the composite image of the subject includes the first image of the subject stitched together with the second image of the subject.

13. A computer-readable medium, excluding signal- and carrier wave-type media, having computer executable instructions stored thereon that, when executed, cause a computing device to perform a method of providing composite image of a subject to a requestor, the method comprising:
receiving a plurality of requests for the composite image of the subject from a plurality of requestors, wherein each of the requestors has a corresponding priority value;
selecting a requestor from the plurality of requestors based on the corresponding priority values;
selecting a first data capture device from a plurality of data capture devices based on stored device information that indicates that the first data capture device is configured to provide at least a first portion of the requested composite image, the first portion corresponding to a first image of the subject, wherein data storage includes the stored device information for each of the plurality of data capture devices including for the first data capture device, and wherein each stored device information comprises a DeviceID that identifies a corresponding data capture device, and a geographic location of the corresponding data capture device, and other characteristics of the corresponding data capture device, and wherein the geographic location of each data capture device in each corresponding stored device information is updated by a device tracker;
generating instructions for the first data capture device that specify how to capture the first image of the subject;
transmitting to the first data capture device a first request for the first image of the subject, and transmitting to the first data capture device the generated instructions for the first data capture device that specify how to capture the first image of the subject;
selecting a second data capture device from the plurality of data capture devices based on the stored device information that indicates that the second data capture device is configured to provide at least a second portion of the requested composite image, the second portion corresponding to the second image of the subject;
generating instructions for the second data capture device that specify how to capture the second image of the subject;
transmitting to the second data capture device a second request for the second image of the subject, and transmitting to the second data capture device the generated instructions for the second data capture device that specify how to capture the second image of the subject;
receiving the first image of the subject from the first data capture device and the second image of the subject from the second data capture device;

synthesizing the requested composite image of the subject based on the first image of the subject and second image of the subject; and transmitting the synthesized composite image of the subject to the selected requestor.

14. The computer readable medium of claim 13, the method further comprising transmitting instructions from the selected requestor to the first data capture device.

15. The computer readable medium of claim 13 wherein the composite image of the subject is navigable.

16. A system for generating a composite image of a subject, the system comprising:
- a computing device;
- an input of the computing device configured for receiving a request from a requestor for the composite image of the subject;
- a data store configured for storing device information for each of a plurality of data capture devices, wherein each stored device information comprises a DeviceID that identifies a corresponding data capture device, and a geographic location of the corresponding data capture device, and other characteristics of the corresponding data capture device;
- a device tracker configured for updating the geographic location of each data capture device in each corresponding stored device information;
- an image capturing component configured for specifying at least two data capture devices of the plurality of data capture devices based on the stored device information, wherein the stored device information of a first data capture device of the at least two data capture devices indicates that the first data capture device is configured for providing at least a first portion of the requested composite image, the first portion corresponding to a first image of at least a portion of the subject, and wherein the stored device information of a second data capture device of the at least two data capture devices indicate that the second data capture device is configured for providing at least a second portion of the requested composite image, the second portion corresponding to a second image of at least a portion of the subject;
- an output component configured for transmitting a first request for the first image to the first data capture device and a second request for the second image to the second data capture device;
- an image input component configured for receiving the first image from the first data capture device and the second image form the second data capture device; and
- an image synthesizer configured for synthesizing the requested composite image of the subject based on the first image and second image.

17. The system of claim 16 wherein the composite image of the subject is a panoramic 3-dimensional image.

18. The method of claim 1 wherein the request includes a desired price for the composite image of the subject.

* * * * *